(12) United States Patent
Fahmy

(10) Patent No.: US 7,646,728 B2
(45) Date of Patent: Jan. 12, 2010

(54) NETWORK MONITORING AND INTELLECTUAL PROPERTY PROTECTION DEVICE, SYSTEM AND METHOD

(75) Inventor: Safwat F. Fahmy, Gulf Stream, FL (US)

(73) Assignee: SafeMedia Corp., Boca Raton, FL (US)

( * ) Notice: Subject to any disclaimer, the term of this patent is extended or adjusted under 35 U.S.C. 154(b) by 422 days.

(21) Appl. No.: 11/549,568

(22) Filed: Oct. 13, 2006

(65) Prior Publication Data
US 2008/0089238 A1 Apr. 17, 2008

(51) Int. Cl.
*H04L 12/56* (2006.01)
(52) U.S. Cl. .................. 370/252; 709/224
(58) Field of Classification Search ........... 370/420; 709/218; 705/67
See application file for complete search history.

(56) References Cited

U.S. PATENT DOCUMENTS

| | | | |
|---|---|---|---|
| 5,862,335 A * | 1/1999 | Welch et al. | 709/224 |
| 6,865,599 B2 * | 3/2005 | Zhang | 709/218 |
| 7,185,062 B2 * | 2/2007 | Lolayekar et al. | 709/213 |
| 7,215,637 B1 * | 5/2007 | Ferguson et al. | 370/230.1 |
| 7,363,278 B2 * | 4/2008 | Schmelzer et al. | 705/67 |
| 7,545,743 B2 * | 6/2009 | Oyama et al. | 370/230.1 |
| 7,554,983 B1 * | 6/2009 | Muppala | 370/392 |
| 2003/0123481 A1 * | 7/2003 | Neale et al. | 370/466 |
| 2004/0013112 A1 * | 1/2004 | Goldberg et al. | 370/389 |
| 2005/0185624 A1 * | 8/2005 | Andersen et al. | 370/338 |
| 2007/0110089 A1 * | 5/2007 | Essafi et al. | 370/420 |
| 2008/0049619 A1 * | 2/2008 | Twiss | 370/236 |
| 2009/0100173 A1 * | 4/2009 | Nagoya et al. | 709/224 |

OTHER PUBLICATIONS

"File Sharing Programs: The Use of Peer-to-Peer Networks to Access Pornography." US Government Accountability Office. GAO-05-634. May 2005. 74 pages.
Liebowitz, Stan J. "File-Sharing: Creative Destruction or Just Plain Destruction?" School of Management:University of Texas at Dallas. Apr. 2006. 31 pages.
Murphy, Declan, Jariath Kelly, Keith Curley, John Vickery and Dan O'Keeffe. "P2P Security." http://mtrg.cs.tcd.ie/undergrad/4ba2.02-03/p10.html. Accessed Oct. 13, 2006.

* cited by examiner

*Primary Examiner*—Thong H Vu
(74) *Attorney, Agent, or Firm*—Hodgson Russ LLP (57) ABSTRACT

A method and device for detecting and halting specified peer-to-peer ("P2P") and/or Internet Relay Chat ("IRC") communication sessions based on a priori defined templates is described. Network packets are intercepted and inspected for patterns (defined by the templates) that identify them as definitely, likely or not being associated with one of the specified P2P and/or IRC protocols. Those packets identified as definitely belonging to one of the specified protocols are prevented from reaching their target destination. Those packets identified as only likely belonging to one of the specified protocols are permitted to continue toward their target destination after select information about the particular session/packet is recorded for later use. Those packets identified as not belonging to one of the specified protocols are permitted to continue to their target destination.

5 Claims, 6 Drawing Sheets

NETWORK MONITORING AND INTELLECTUAL PROPERTY PROTECTION DEVICE, SYSTEM AND METHOD

BACKGROUND

The invention relates generally to network monitoring devices and methods for the protection of intellectual property and more particularly, but not by way of limitation, to the detection and halting of peer-to-peer communications between computer systems.

A peer-to-peer ("P2P") computer network is a network that relies primarily on the collective computing power and bandwidth of the network's individual nodes rather than concentrating it's computational power in a relatively few dedicated systems or servers. P2P networks are typically used for connecting nodes via largely ad hoc connections for sharing files (e.g., audio and video data files) and realtime data (e.g., Internet telephony traffic).

Because of its decentralized nature, ease of use and widespread distribution, P2P technology has become one of the principal means by which Internet users share and distribute information. Organizations (e.g., businesses and academic institutions) have recognized the danger unregulated use of P2P operations pose to the function of their networks. These dangers include, but are not limited to, exposing the organization's network to the introduction of viruses (programs that are loaded onto a user's computer without their knowledge and that usually perform malicious actions), spyware (software that covertly gathers user information and transmits that information to an unknown third party) and malware (software that is intentionally included or inserted in a system for a harmful purpose), the excessive use of network storage facilities, the loss of proprietary data (e.g., trade secrets) and the liability associated with their users (e.g., employees and students) sharing and distributing copyrighted material without the owners consent.

Current attempts to limit or prevent use of P2P technology (and related technologies such as, for example, "IRC" or Internet Relay Chat) rely on published "rules" that users must agree to for the privilege of using an organization's network and/or network administrator-based monitoring. In the former, one's agreement to forgo use of P2P technology does not in itself prevent such use. In the latter, it is incumbent upon the network's administrator (and their staff) to police, detect and enforce the organization's P2P policies. The rapid and acknowledged use of P2P technology for the widespread distribution of copyrighted and other proprietary material attests to the limited ability of these approaches to satisfactorily deal with the use of P2P networks. Thus, it would be beneficial to provide a mechanism to automatically detect and halt peer-to-peer communications to, or from, an organization's network.

SUMMARY

In one embodiment the invention provides a method to effectively block one or more a priori specified communication sessions. The method includes intercepting a network packet in route from a source to a destination, analyzing the network packet and preventing the network packet from arriving at the destination if it is determined (during the act of analyzing) to be associated with one of a specified plurality of peer-to-peer and/or Internet relay chat protocols. In one embodiment, the act of analyzing includes comparing selected portions of the network packet against a plurality of predefined templates, wherein each template identifies a forensically determined signature (i.e., a specified data pattern, its location and, perhaps, a length). In addition, each template specifies an action to take if the packet matches its signature. For example, one action may be to simply prevent the packet from reaching its destination. Another action may be to record information about the packet in a system state table for comparison to subsequently received packets and then either drop the packet or permit it to reach its destination. The former action is appropriate where the template's signature does not definitively identify the packet as belonging to a prohibited protocol while the latter may be more appropriate where two or more packets in a communication session are needed to make this determination.

In another embodiment, methods in accordance with the invention may be stored in any media that is readable and executable by a computer system. In one such embodiment, the invention provides a device including memory (for storing instructions in accordance with the invention) and a processing unit (for executing said instructions) that may be used to analyze network traffic. Such a device may be placed between two networks (e.g., a private network and a public network or between two private networks).

DETAILED DESCRIPTION

The following descriptions are presented to enable any person skilled in the art to make and use the invention as claimed and are provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

In one embodiment of the invention, a network monitoring and intellectual property protection method inspects network packets into and out of a given network (e.g., an organization's local area network) to determine if the packet is part of a prohibited transaction (e.g., a P2P or IRC communication stream). In another embodiment of the invention, a network device is configured to perform the aforementioned network monitoring and intellectual property protection operations.

Figure 1:
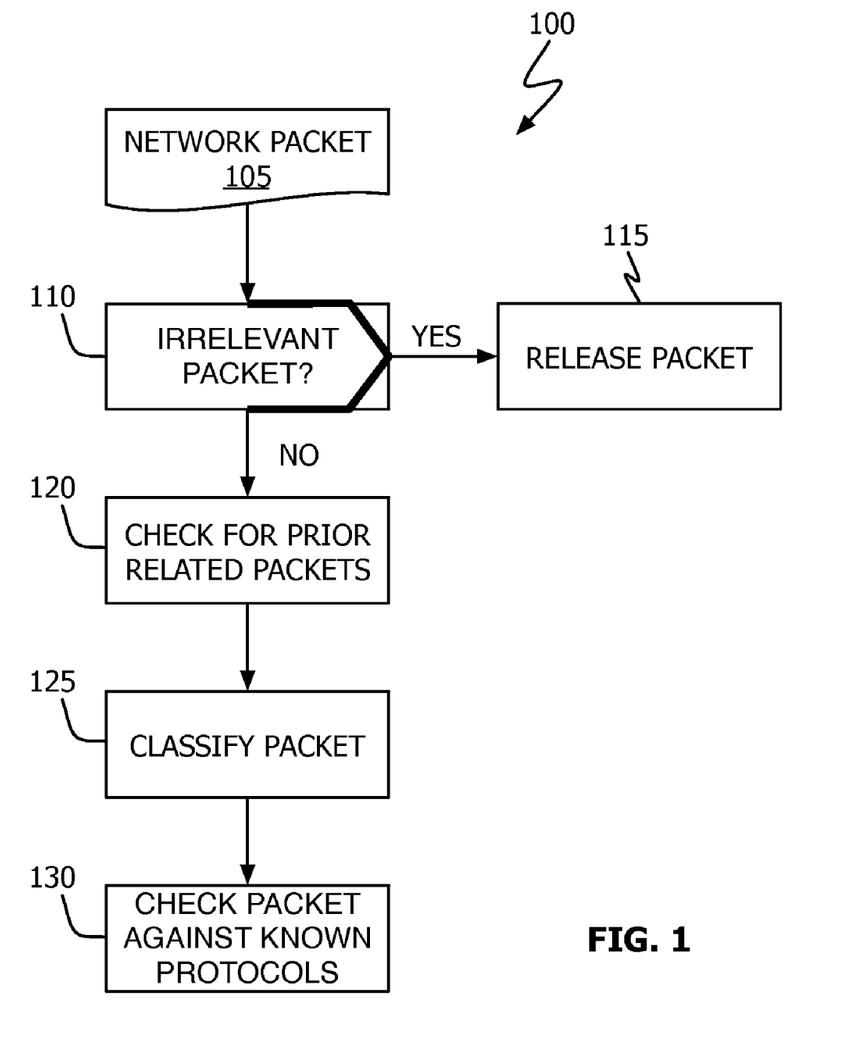
FIG. 1 shows, in flowchart format, a network monitoring method in accordance with one embodiment of the invention.

Referring to FIG. 1, network monitoring and intellectual property protection process 100 in accordance with one embodiment of the invention begins when network packet 105 is received. If the packet is irrelevant (the "Yes" prong of block 110), it is released, that is, allowed to propagate toward its destination (block 115). In one particular embodiment, irrelevant network packets include non-Ethernet and non-Internet Protocol ("IP") packets. If packet 105 is relevant (the "No" prong of block 110), a check is made to determine if the packet belongs to a prior inspected transaction (block 120). If this is so, and interrogation of packet 105 confirms it is part of a prohibited transaction (e.g., a P2P or IRC transaction), packet 105 is dropped. Otherwise, packet 105 is classified as belonging to one of a plurality of relevant packet types (block 125). By way of example, relevant network packets include, but are not limited to, Transport Control Protocol ("TCP") stream packets, User Datagram Protocol ("UDP") announcements and Hyper Text Transfer Protocol ("HTTP") request packets. Once classified, certain characteristics of packet 105 are checked against known prohibited protocol characteristics (block 130). During the acts of block 130: if packet 105 is identified as belonging to a prohibited protocol, it is dropped; if packet 105 is identified as not being associated with a prohibited protocol it is released (allowed to propagate toward its destination); and if packet 105 cannot be definitively identified as either belonging or not belonging to a prohibited transaction, information concerning the packet is retained for evaluating subsequently received data packets (e.g., during the acts of block 120) and released.

Figure 2:
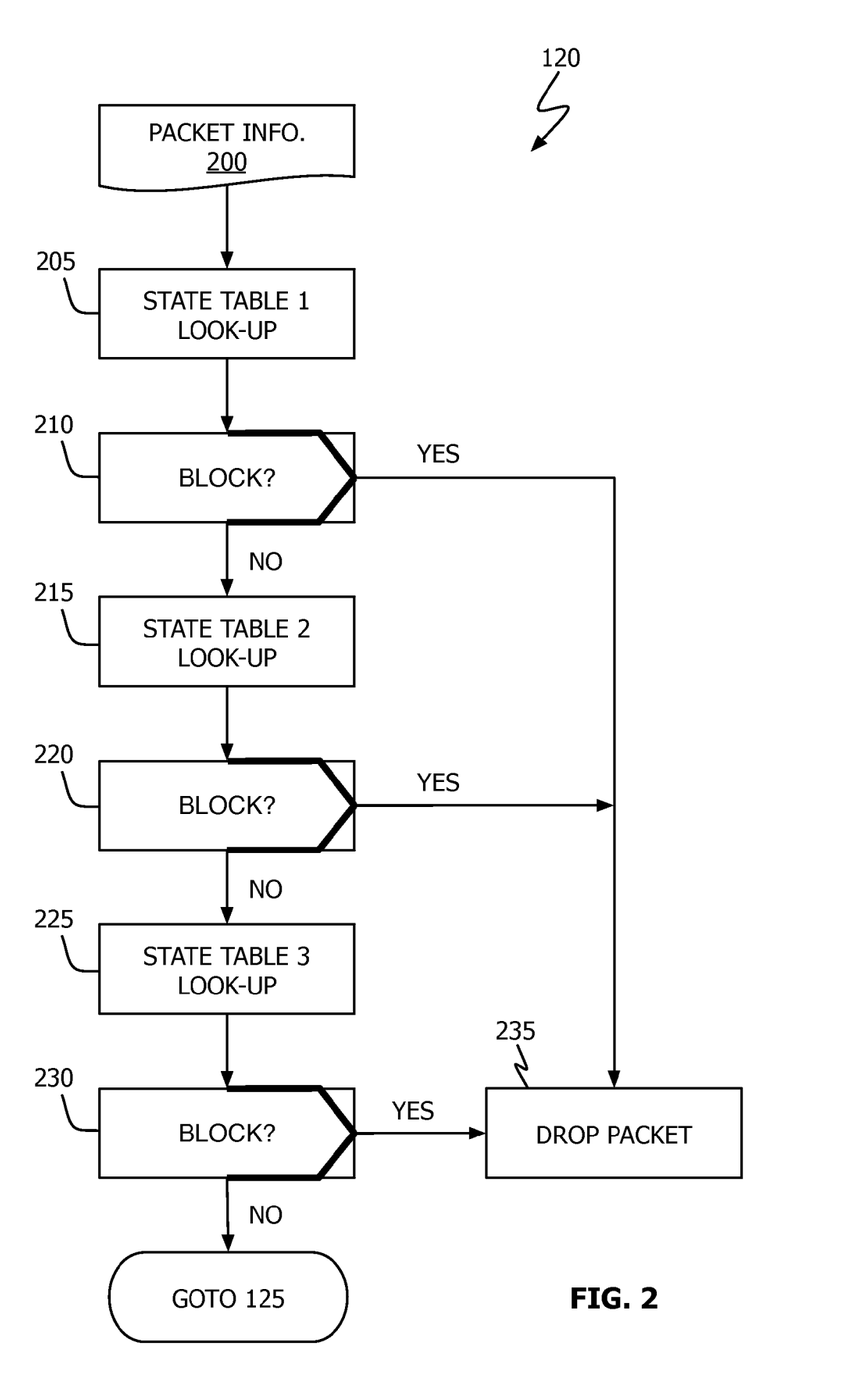
FIG. 2 shows, in flowchart format, one method in accordance with the invention for determining if a current network packet is related to a prior identified transaction.

One illustrative technique to determine if the current packet is related to a prior received packet is shown in FIG. 2 (i.e., block 120). It will be recognized that for efficiency, each received packet may be "filtered" to obtain the information necessary for tracking and identifying the packet as belonging to a prohibited protocol. Such information can include any data or value included in or encoded within the packet such as, for example, packet sequence number, packet direction (e.g., into or out of a given network), header byte length, packet type, source IP address, destination IP address, source port identifier, destination port identifier, frame number, packet length, payload byte length, SYN (request for information) and ACK (information acknowledgement) flags, checksum and window size values—that is, information retained in a packet's layer 1, 2 or 7 structure. As used herein, layers 1, 2 and 7 refer to layers as defined in the Open Systems Interconnection ("OSI") Reference Model, a communications standard sponsored by the International Standards Organization ("ISO"). Illustrative packet types include, but are not limited to, those used in TCP, UDP, HTTP, ARP (Address Resolution Protocol), SSDP (Simple Service Discovery Protocol), NBNS NetBIOS Name Server) and POP (Post Office Protocol) protocols. Packet information obtained in this manner will be referred to as a "captured element" or "captured characteristic." In an embodiment implemented for the Linux® operating system, packet filtering may be based the Linux netfilter packet filtering framework. (LINUX is a registered trademark of Linus Torvalds.)

In the embodiment illustrated in FIG. 2, for example, packet information 200 is used to access three system state tables to determine if the current packet is related to a prior received network packet. In a first system state table look-up operation, one or more of the current packet's captured characteristics (see discussion above) are combined (e.g., concatenated) and used as a key into a first system state table (block 205). If an entry is found and its value indicates the packet should be dropped (the "Yes" prong of block 210), the packet is dropped (block 235). If there is no entry associated with the key or the entry's value indicates that the packet should not be dropped (the "No" pong of block 210), a second system state table look-up operation is performed (block 215). In this second system state table look-up, a different collection of one or more of the current packet's captured characteristics are used as a key. If an entry is found and its value indicates the packet should be dropped (the "Yes" prong of block 220), the packet is dropped (block 235). If there is no entry associated with the key or the entry's value indicates that the packet should not be dropped (the "No" pong of block 220), a third system state table look-up operation is performed (block 225). In this third system state table look-up, yet another collection of one or more of the current packet's captured characteristics are used as a key. Again, if an entry is found and its value indicates the packet should be dropped (the "Yes" prong of block 230), the packet is dropped (block 235). If there is no entry associated with the key or the entry's value indicates that the packet should not be dropped (the "No" pong of block 230), processing continues in accordance with block 125. By way of example, each of the system state tables accessed during the acts of block 120 (FIG. 2) may be implemented as arrays, database tables, linear lists or the like. The type of information that may be retained in the system state tables include: one or more captured characteristics; a protocol identifier (a unique identifier assigned to each protocol being analyzed); a match-block-action value that indicates whether the associated packet should be dropped (e.g., BLOCK) or not dropped (e.g., NON_BLOCK); a timestamp (to indicate the time the entry was last used); and any protocol specific information necessary to allow two or more sequentially received packets to be logically identified as part of a common communications session such as some or all of the packet's payload data (in binary or ASCII format), a forensically determined protocol signature and protocol DNA.

Generally speaking, if no system state table entry is found during the acts of block 205, 215 or 225, either the communication session to which the current packet belongs has not been seen before or the packet belongs to a session that should not be blocked. If a system state table entry is found and its match-block-action value (or a functionally equivalent value) indicates that it should not be dropped, this implies that while one or more packets in the packet's communication session has been seen before, additional processing is needed to conclusively determine if the packet belongs to a prohibited communications session (e.g., a P2P or IRC session). Finally, if a system state table entry is found and its match-block-action value indicates that it should be dropped, this implies that the current packet belongs to a prior-seen session and provides the information necessary to conclusively determine the packet belongs to a prohibited communications session.

Figure 3:
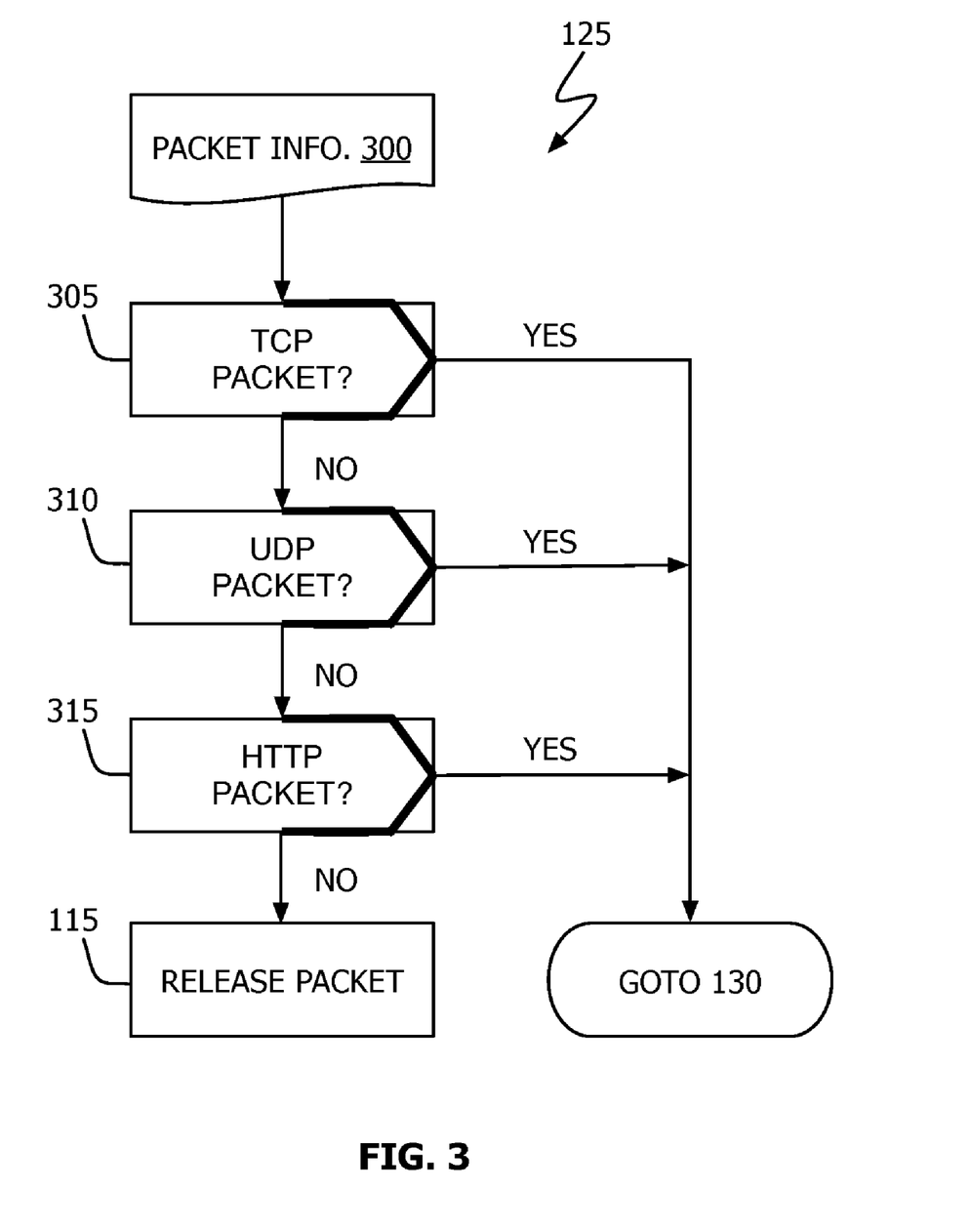
FIG. 3 shows, in flowchart format, one method in accordance with the invention for classifying network packets.

Referring to FIG. 3, packet classification in accordance with block 125 inspects packet information 300 (e.g., network packet 105) to determine if the current packet is a TCP packet (the "Yes" prong of block 305), a UDP packet (the "Yes" prong of block 310) or an HTTP packet (the "Yes" prong of block 315). If the current packet is not any of these types (e.g., is not relevant—see discussion above regarding block 110 in FIG. 1), the packet is released (block 115). It will be recognized that identification of packet type typically involves the inspection of the packet's header and/or payload information. For example, it is known that TCP and UDP packets are explicitly identified as such in their headers. It is further known that HTTP packets are TCP type packets whose first four bytes in their layer-7 ("payload") segment are GET_, HEAD, PUSH or POST (where "_" can be any value). As used herein, layer-7 corresponds to the application layer as defined in the Open Systems Interconnection ("OSI") Reference Model, a communications standard sponsored by the International Standards Organization ("ISO"). In addition, in one embodiment the following information is extracted or recorded for packets identified as HTTP type packets: argument offset; host offset; and user agent offset (also typically found in the packet's layer-7 segment).

Referring again to FIG. 1, if the current packet has not been dropped or released in accordance with the acts of blocks 110, 120 or 125, the packet is compared against protocol templates to ascertain whether the packet should be dropped (because it is part of a prohibited transaction), released (because it is not part of a prohibited transaction) or if information should be retained so that future packets can be analyzed in accordance with the acts of block 120.

In general, a template encapsulates the rules by which a packet is determined to be part of a specified protocol (e.g., WinMX, Kademilia or Myster) and an indication of the action to take if such determination is made. In one embodiment, each protocol being screened is associated with one or more templates. Each template, in turn, specifies one or more data patterns ("forensic signatures" or, more simply, "signatures") within a packet that may be used to identify that packet as part of a communication session of that protocol's type and where (e.g., as an offset into the packet's layer-7 payload segment) the data pattern may be found within the packet. Some templates may also include a "length" characteristic which, when combined with the forensic signature, may also be used to uniquely associate a packet with a P2P or IRC protocol. As used here, the term "length" refers to the size of the packet's layer-7 payload segment. In addition, each template has an assigned protocol-ID (unique across all protocols), a template-ID (unique within a given protocol), a protocol type identifier (e.g., TCP or UDP) and an action function identifier designating what action to take if the current packet matches the template's signature.

Template signatures are based on a forensic a priori analysis of packets from those protocols being screened. That is, multiple packets from each protocol to be blocked are obtained and analyzed to determine the unique characteristics that identify it as part of a communication session for a prohibited protocol. It will be appreciated that the large number of P2P and IRC protocols combined with the fact that each protocol may exhibit multiple variations (transmitted using one or more protocols, e.g., TCP, HTTP and UDP), can make the task of developing signatures time-consuming. Nevertheless, such work would be within the skill of one of ordinary skill in the art of network security and programming having the benefit of this disclosure.

In general, template action functions place an entry in one or more of the system state tables corresponding to the current packet and set that entries match-block-action value to BLOCK or NON_BLOCK. The table entry is set to BLOCK if the template's signature match indicates that the packet is strongly related to a prohibited protocol (e.g., definitively identifies the packet as belonging to a prohibited communication protocol) and to NON_BLOCK if the template's signature match indicates that the packet is weakly related to a prohibited protocol (e.g., does not definitively identify the packet as belonging to a prohibited communication protocol). The exact value (BLOCK or NON_BLOCK) has been found to be a function of the specific protocol being checked and, as a result, is dependent upon how well or conclusively the template's signature uniquely identifies the packet as being associated with a given protocol. As a result, this information varies form protocol to protocol and, even, over time as the specific P2P/IRC protocols evolve. Nevertheless, one of ordinary skill in the art would be able to determine these differences given the present teaching.

In one embodiment, four different types of templates are used which are referred to herein as: instant kill templates, kill identification templates, protocol identification templates and source templates. Generally speaking, instant kill templates are applied when a signature definitively identifies a packet as belonging to a prohibited protocol. Kill identification, protocol identification and source templates (collectively referred to as response kill templates), on the other hand, are applied when one or more packets in the communication session are required to definitively identify the use of a prohibited protocol.

Figure 4:
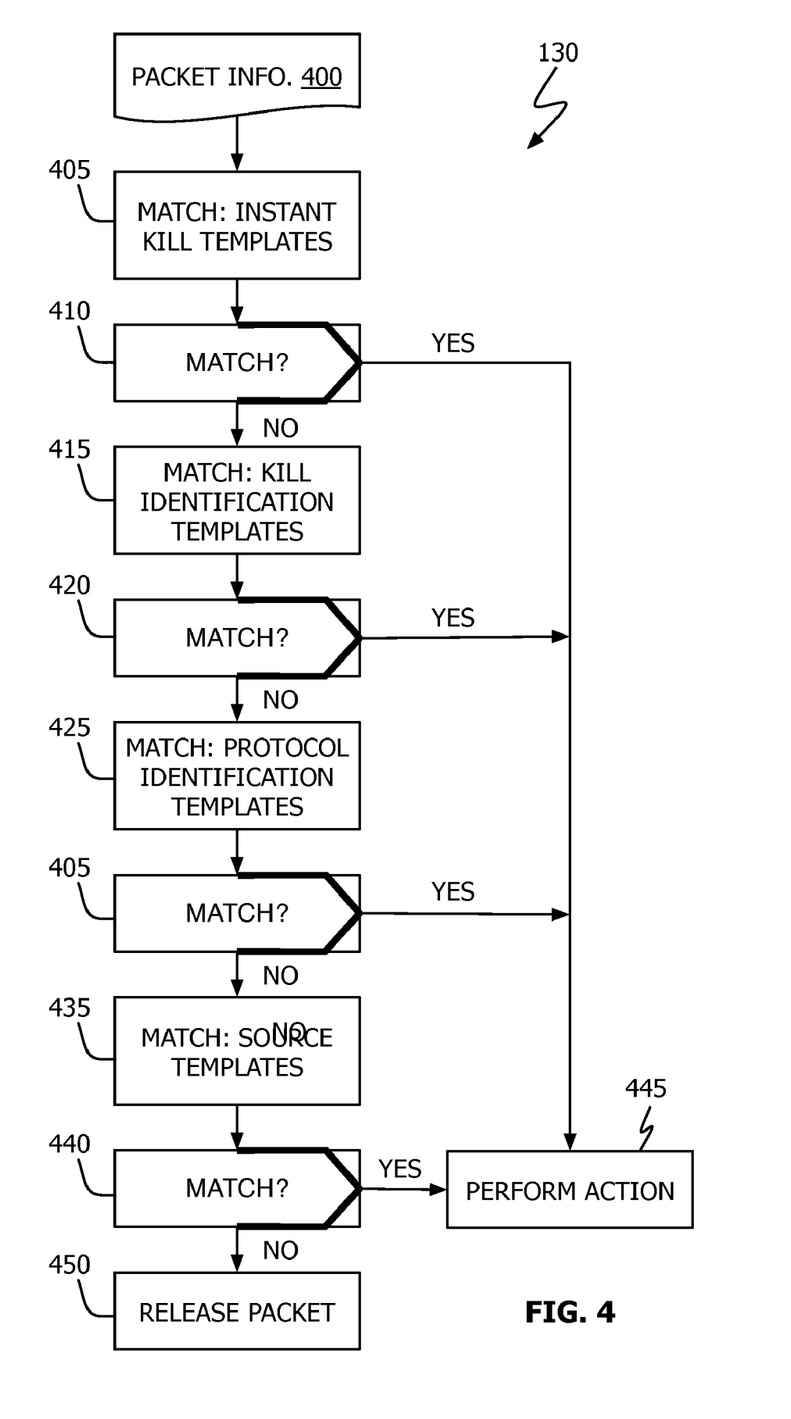
FIG. 4 shows, in flowchart format, one method in accordance with the invention for checking packets against known protocols.

Referring to FIG. 4, once classified as belonging to one of a specified plurality of protocol types in accordance with the acts of block 125 (see FIGS. 1 and 3), packet information 400 is compared against a series of template types. For example, instant kill (block 405), kill identification (block 415), protocol identification (block 425) and source templates (block 435). If a match is found during any one of these matching operations (the "Yes" prong of blocks 410, 420, 430 and 440), the action function specified in the template is performed (block 445). If no match is found (the "No" prong of blocks 410, 420, 430 and 440), the packet is released (block 450).

For efficiency, it has been found beneficial to perform template matching operations on a packet-type basis wherein only those templates applicable to the current packet's type are checked. For example, if the current packet is a UDP type packet, then only those instant kill templates applicable to UDP packets are checked during the acts of block 405. This same approach may be applied during the template matching operations of blocks 415, 425 and 435. It has also been found beneficial to check templates in a most-used to least-used order (i.e., blocks 405, 415, 425 and 435). That is, if the current packet is a TCP type packet and protocol-1 is the most widely used TCP-based P2P/IRC protocol, templates associated with protocol-1 are matched first. Additional templates would be checked in descending order of their use. It will be recognized that the prevalence of a given protocol may vary from time to time, and that this determination may be made by observing network traffic for each of the targeted protocols.

One use of the network monitoring and intellectual property protection technology described herein is to prevent P2P and/or IRC communication sessions between users of a private or internal network (e.g., a corporate or educational network) and an external network such as, for example, the Internet. By way of example, consider FIG. 5A in which network monitoring and intellectual property protection system 500 in accordance with one embodiment of the invention includes external network 505 (e.g., the Internet), external router 510, network monitoring device 515, firewall 520, internal router 525 and one or more internal networks 530 and 535 (e.g., local area networks, "LANs").

Figure 5A:
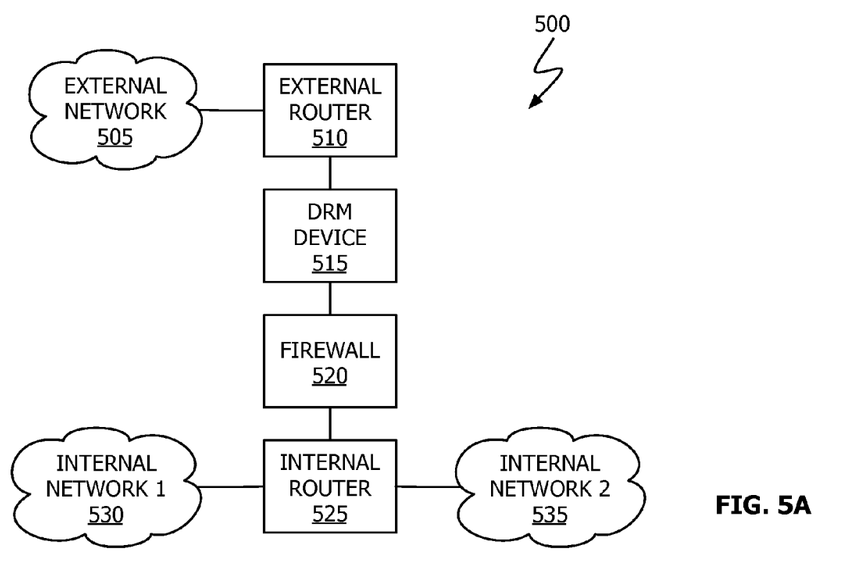
FIGS. 5A and 5B show, in block diagram format, a network monitoring and intellectual property management system in accordance with various embodiments of the invention.
Figure 5B:
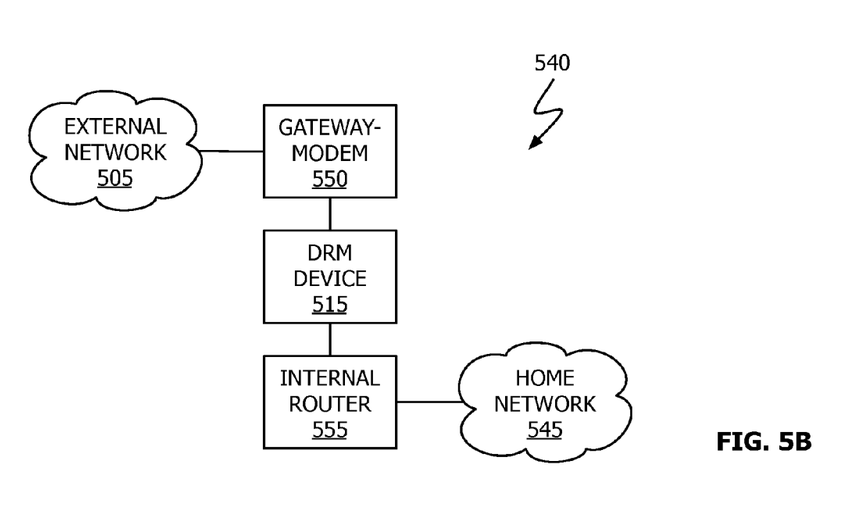

In another embodiment, network monitoring device 515 may be used to automatically detect and halt P2P and IRC communications between an external network and a private or household network. Referring to FIG. 5B, in this version of network monitoring and intellectual property protection system 540, external network 505 is coupled to home network 545 via cable or DSL modem 550 and internal router 555.

In still another embodiment, network monitoring device 515 may be used to prevent P2P and/or IRC communication sessions between users within a common network. Referring to FIG. 5A, for example, digital monitoring device 515 may be positioned in the communication path between users of internal network 1 530 and internal network 2 535.

Figure 6:
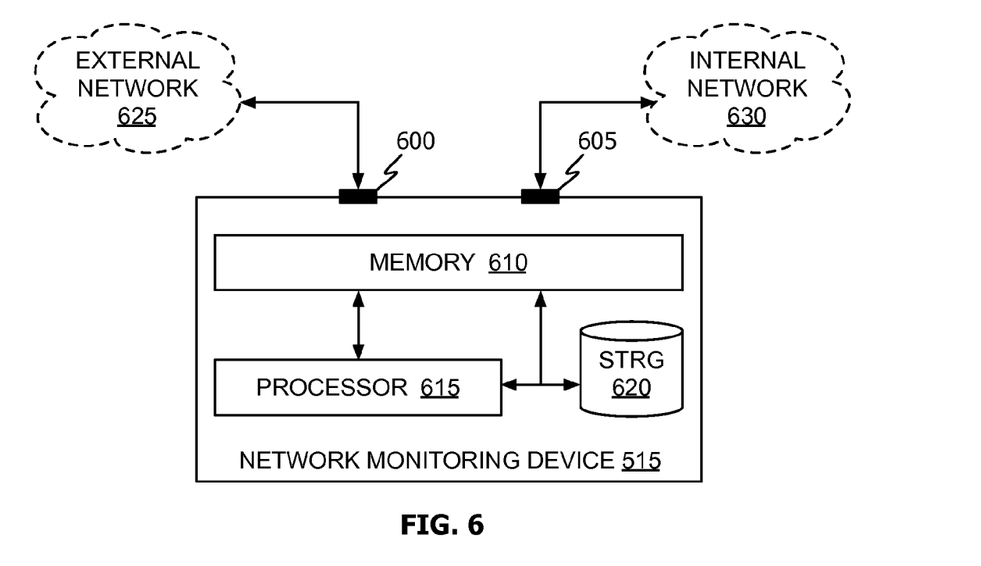
FIG. 6 shows, in block diagram format, a network monitoring and intellectual property management device in accordance with one embodiment of the invention.

Referring to FIG. 6, in one embodiment network monitoring device 515 includes communication ports 600 and 605, memory 610, processor 615 and storage unit 620. Communication ports 600 and 605 may couple directly to networks 625 and 630 or indirectly as illustrated in FIG. 5. Although not required by the claimed invention, in the described embodiments network monitoring device 515 captures/monitors network packets in a bidirectional manner. That is, packets are analyzed as they move from external network 625 toward internal network 630, and as they move from internal network 630 toward external network 625. Memory 610 generally comprises random access memory ("RAM" and may be volatile, non-volatile or a combination of volatile and non-volatile memories. For example, one portion of memory 610 may comprise volatile RAM for use in storing network packets (e.g., packet 105) during analysis in accordance with the invention. Another portion of memory 610 may comprise non-volatile memory for storing program code that controls the overall operation, or supports the overall operation, of network monitoring device 515. In one embodiment, all templates are retained in volatile RAM 610 (during operation) while non-volatile memory 610 may retain program code that facilitates remote management of network monitoring device 515. Processor 615 comprises a programmable control device and may be a conventional computer processor (e.g., a reduced or complex instruction set central processing unit), a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage unit 620 may comprise any long-term storage device such as, for example, one or more of the following: Storage devices suitable for tangibly embodying program instructions include, but are not limited to: magnetic disks (fixed, floppy, and removable); magnetic tape; and optical media such as CD-ROMs and digital video disks ("DVDs").

Various changes in the materials, components, circuit elements, as well as in the details of the illustrated operational methods are possible without departing from the scope of the following claims. By way of example, while network monitoring and intellectual property protection systems 500 and 540 show network monitoring device 515 as a stand-alone unit, this is not required. In one embodiment the functionality associated with network monitoring device 515 may be wholly (or partially) provided by a general purpose computer system programmed to perform one or more acts illustrated in of FIG. 1. In addition, while the invention has been described in the context of a single processing flow, it will be recognized by those of ordinary skill in the art that a "threaded" approach may also be implemented. In such implementations, two or more threads (each analyzing one or more network packets) may operate concurrently. In addition, classification operations in accordance with block 125 (FIGS. 1 and 3) do not need to be performed. That is, once a packet passes through processing in accordance with block 120 (i.e., is not dropped or released), processing could continue directly to block 130 (FIGS. 1 and 4).

The invention claimed is:

1. A peer-to-peer communication management method, comprising:
    intercepting a network packet in route from a source to a destination;
    releasing the network packet to the destination if the network packet is identified as belonging to a first class of protocols, else;
    comparing selected portions of the network packet against a plurality of predefined templates, each of said templates being associated with one of a specified plurality of peer-to-peer protocols;
    identifying, based on the act of comparing, the network packet as being strongly or weakly associated with one of the specified plurality of peer-to-peer protocols;
    preventing the network packet from arriving at the destination if the packet is identified as strongly associated with one of the specified plurality of peer-to-peer protocols; and
    recording information about the network packet if the network packet is identified as weakly associated with one of the specified plurality of peer-to-peer protocols and, thereafter, releasing the network packet to the destination.

2. The method of claim 1, wherein the first class of protocols comprise non-Internet Protocols ("IP").

3. The method of claim 2, wherein the first class of protocols comprise non-Ethernet Protocols.

4. The method of claim 1, wherein the act of recording information comprises recording a characteristic of the packet in a system state table, wherein the characteristic comprises one or more of: packet sequence number, packet direction, header byte length, packet type, source IP address, destination IP address, source port identifier, destination port identifier, frame number, packet length, payload byte length, SYN (request for information) and ACK (information acknowledgement) flags, checksum and window size values.

5. A program storage device, readable by a programmable control device, comprising instructions stored on the program storage device for causing the programmable control device to perform the acts in accordance with claim 1.

* * * * *